United States Patent [19]
Huang et al.

[11] Patent Number: 5,917,262
[45] Date of Patent: Jun. 29, 1999

[54] STATOR STRUCTURE FOR MINIATURIZED DC BRUSHLESS MOTOR

[75] Inventors: Shin-Ming Huang; Tien-Yo Yao, both of Hsinchu, Taiwan

[73] Assignee: Industrial Technology Research Institute, Hsinchu, Taiwan

[21] Appl. No.: 08/877,099

[22] Filed: Jun. 17, 1997

[51] Int. Cl.[6] ............................. H02K 7/00; H02K 1/12
[52] U.S. Cl. .................... 310/254; 310/40 MM; 310/49 R; 310/67 R; 310/68 R; 310/258; 310/259
[58] Field of Search .................. 310/67 R, 68 R, 310/91, 254, 255, 256, 257

[56] References Cited

U.S. PATENT DOCUMENTS

| | | | |
|---|---|---|---|
| 4,642,496 | 2/1987 | Kerviel et al. | 310/68 B |
| 4,672,247 | 6/1987 | Madsen et al. | 310/49 R |
| 4,965,476 | 10/1990 | Lin | 310/51 |
| 5,093,599 | 3/1992 | Horng | 310/254 |
| 5,679,997 | 10/1997 | Matsuzawa et al. | 310/254 |

Primary Examiner—Elvin G. Enad
Attorney, Agent, or Firm—W. Wayne Liauh

[57] ABSTRACT

A stator structure for miniaturized DC brushless motor is disclosed. It contains: (a) a ring coil having an axially extending hole; (b) a first stator-pole piece having an axially extending hole on which a first protruded tubular piece is formed, the first stator-pole piece being axially coupled to the coil ring by inserting the first protruded tubular piece into the axially extending hole of the ring coil; (c) a second stator-pole piece having an axially extending hole on which a second protruded tubular piece is formed, the second stator-pole piece being axially coupled to the ring coil by inserting the second protruded tubular piece into the axially extending hole of the ring coil opposite to the first protruded tubular piece on the stator-pole piece, wherein the first and second protruded tubular pieces have same diameter and come into tight contact to form one interface therebetween; and (d) a bearing penetrating successively through the axially extending hole of the first stator-pole piece and the axially extending hole of the ring coil to be axially coupled to the second protruded tubular piece on the second stator-pole piece. The one-gap construction simplifies the parts requirement and reduces the manufacturing cost.

2 Claims, 3 Drawing Sheets

STATOR STRUCTURE FOR MINIATURIZED DC BRUSHLESS MOTOR

BACKGROUND OF THE INVENTION

1. Field of the Invention

This invention relates to direct-current (DC) brushless motors, and more particularly, to a stator structure for use in miniaturized DC brushless motors.

2. Description of Related Art

In this information age, office automation devices such as personal computers (PC) and other accessaries are becoming indispensable tool both at offices and home. For heat dissipation need, all these devices require the use of miniaturized brushless motors. For volume reduction need, the miniaturization of brushless motors become more and more important.

FIG. 1 shows an exploded perspective view of a conventional stator structure and the associated rotor structure for a DC brushless motor, which is disclosed in U.S. Pat. No. 5,093,599. In that patent, for the miniaturized fan motor, the stator-poles construction thereof is made of one sheet. As shown in FIG. 1, the stator structure includes a self-lubricating bearing 1, a sleeve tube 2, a ring coil 3, an upper stator-pole piece 4a, and a bottom stator-pole piece 4b, components 2, 4a, and 4b are made of permeable materials for miniature motor, 4a and 4b are not laminated that is say 4a, 4b are single sheeted, while the associated rotor structure includes a shaft 5, a rotor magnet 6, and a circuit board 7.

The sleeve tube 2 is a tubular member having a large-diameter portion in the center and two small-diameter portions on the two ends thereof. The small-diameter portions are used to axially mount the upper and bottom stator-pole pieces 4a, 4b thereon.

As illustrated in FIG. 3A, when the upper and bottom stator-pole pieces 4a, 4b are axially mounted the sleeve tube 2, there are two interfaces, as respectively indicated by the reference numerals 10a and 10b, formed therebetween. The drawback in the prior art stator structure is its complex structure. For example the sleeve tube 2 is formed by lathing, which causes the manufacturing work laborious to carry out. Moreover, since the stator structure is composed of a large number of components, the manufacturing cost of the brushless motor is high. Briefly, this invention can simplied the motor structure with minimized motor size without reducing the motor performance

SUMMARY OF THE INVENTION

It is therefore a primary objective of the present invention to provide a stator structure for a DC brushless motor which can minimize the motor volume without reducing the motor performance.

It is another objective of the present invention to provide a stator structure for a DC brushless motor which can be constructed with a reduced number of components.

It is still another objective of the present invention to provide a stator structure for a DC brushless motor which allows the assembly work to be easier to carry out.

It is yet another objective of the present invention to provide a stator structure for a DC brushless motor which can be constructed at a reduced manufacturing cost.

In accordance with the foregoing and other objectives of the present invention, an improved stator structure for a DC brushless motor is provided.

In a first preferred embodiment of the invention, the stator structure includes:

a ring coil having an axis hole;

a first stator-pole piece having an axis hole on which a first protruded tubular piece is formed, the protruded piece is done be drawing, the first stator-pole piece being axially coupled to the ring coil by inserting the first protruded tubular piece into the axis hole of the ring coil;

a second stator-pole piece having an axis hole on which a second protruded tubular piece is formed, the second stator-pole piece being axially coupled to the coil ring by inserting the second protruded tubular piece into the axis hole of the ring coil interface to the first protruded tubular piece on the first stator-pole piece, the first and second protruded tubular pieces coming into tight contact to form one interface therebetween; and bearing penetrating successively through the axis hole of the first stator-pole piece and the axis of the ring coil to be axially coupled to the second protruded tubular piece on the second stator-pole piece.

It is a distinctive feature of the foregoing stator structure that the combination of the bearing, the first and second stator-pole pieces, and the ring coil forming a magnetic flux path with miniature structure.

In a second preferred embodiment of the invention, the stator structure includes:

a ring coil having an axis hole;

a first stator-pole piece having an axis hole on which a protruded tubular piece is formed, the first magnetic-pole piece being axially coupled to the ring coil by inserting the first protruded tubular piece into the axis hole of the ring coil;

a second stator-pole piece having an axis hole, the second stator-pole piece being axially coupled to the ring coil by fitting the protruded tubular piece on the first stator-pole piece through the axis hole of the ring coil into the axis hole of the second stator-pole piece, the first and second protruded tubular pieces coming into tight contact to form one interface therebetween; and;

a bearing penetrating successively through the axis hole of the first stator-pole piece and the axis of the ring coil to be axially coupled to the second protruded tubular piece on the second stator-pole piece.

It is a distinctive feature of the foregoing stator structure that the combination of the first and second stator-pole pieces forming a magnetic flux path with miniature structure.

The invention allows for the forming of only one gap in the magnetic path formed by the upper and bottom stator-pole pieces. This allows for an less power loss of the brushless motor compared to the prior art. Moreover, the number of components required for constructing the stator structure of the invention is also less than that required for the prior art since the flux-guiding sleeve required for use in the prior art is here eliminated. The assembly work is thus easier to carry out and the manufacturing cost can be reduced.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 1:
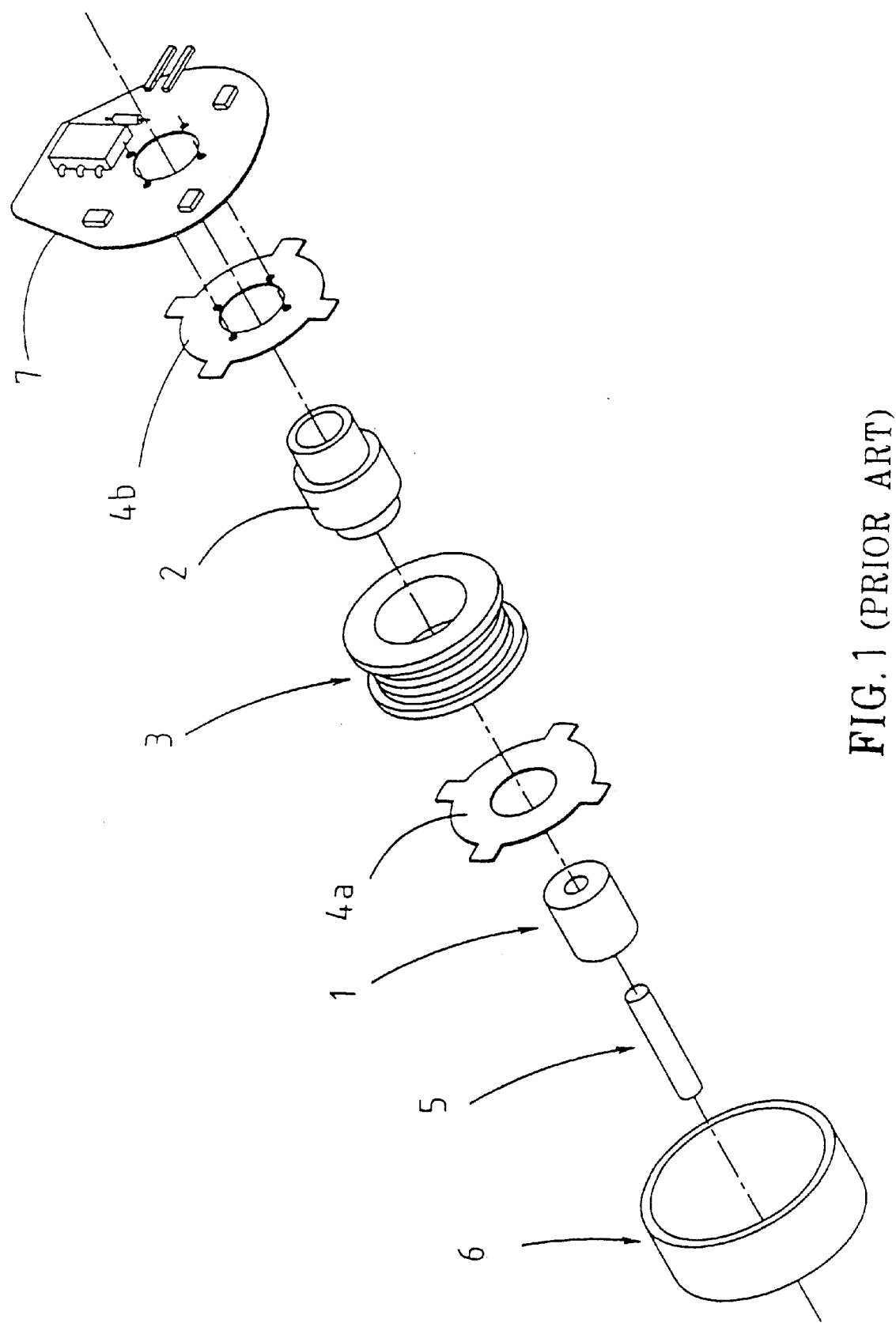
FIG. 1 is an exploded perspective view of a conventional stator structure and the associated rotor structure for a DC brushless motor.
Figure 2:
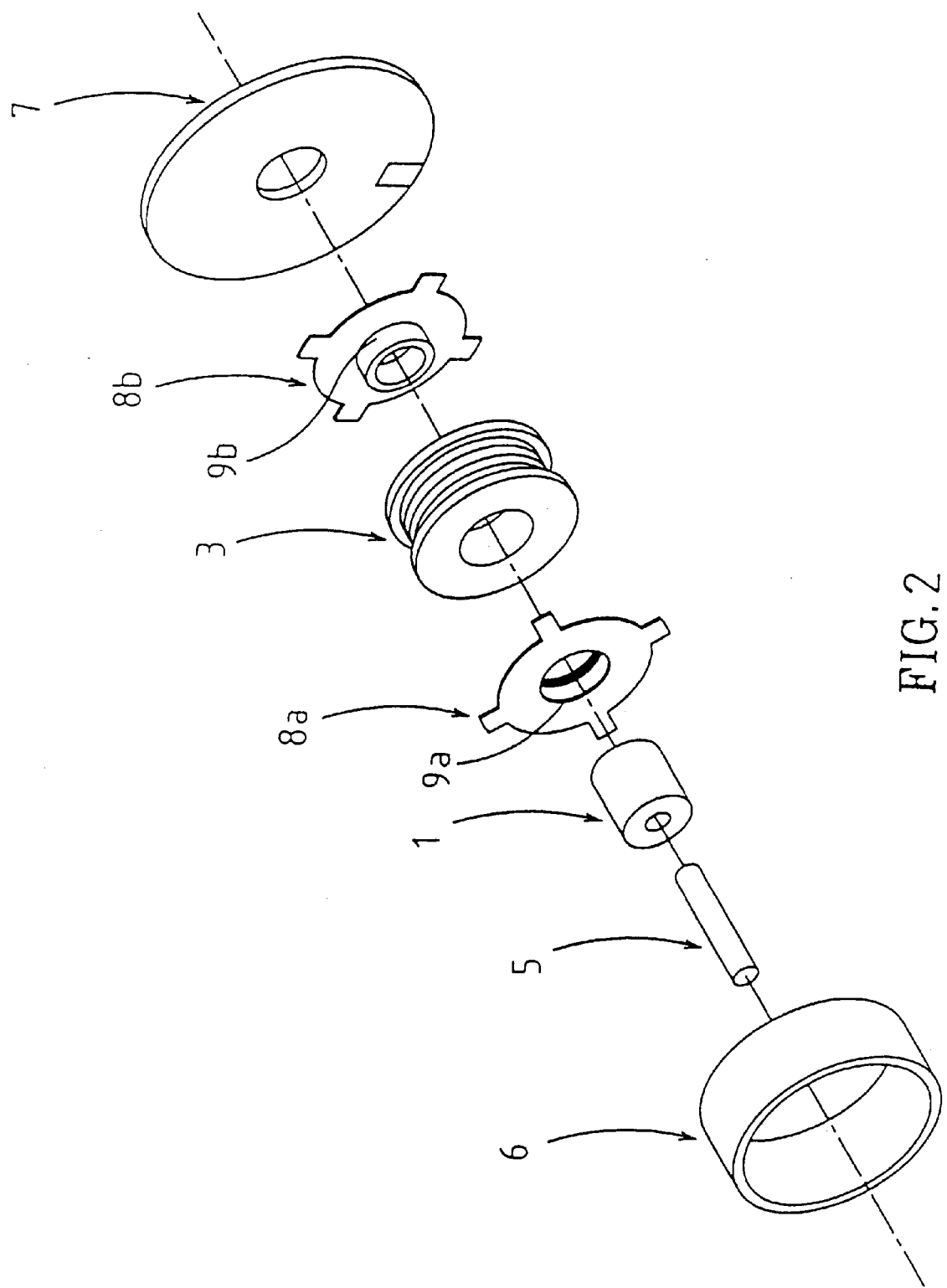
FIG. 2 is an exploded perspective view of a stator structure in accordance with the invention and the associated rotor structure for a miniaturized DC brushless motor.

FIG. 2 is an exploded perspective view of a stator structure of the invention and the associated rotor structure for a DC brushless motor. In FIG. 2, those elements that are identical in structure to those in the prior art of FIG. 1 are labeled with the same reference numerals. This stator structure differs from the prior art of FIG. 1 in that the upper and bottom stator-pole pieces 4a, 4b in the prior art of FIG. 1 are here shaped in a different manner (which are labeled with the new reference numerals 8a, 8b) in accordance with the invention such that the sleeve tube 2 in the prior art of FIG. 1. can be eliminated.

Figure 3A:
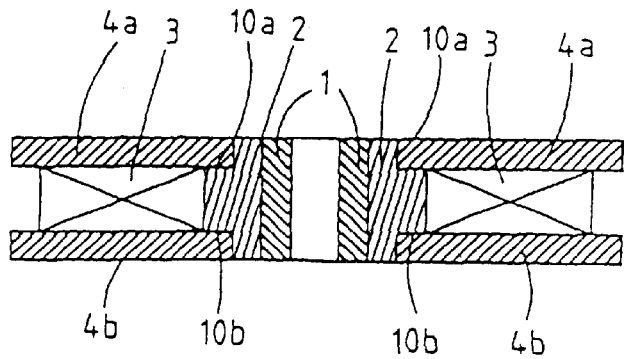
FIG. 3A is a schematic longitudinal sectional diagram of the conventional stator structure for the brushless motor of FIG. 1.
Figure 3B:
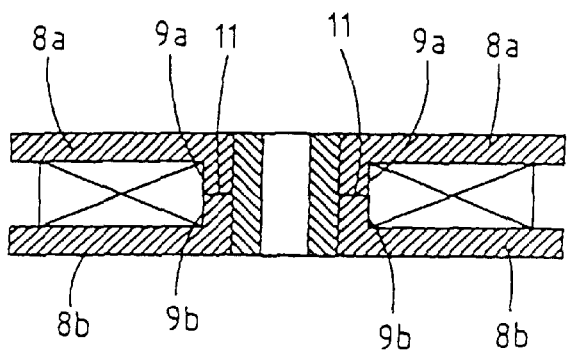
FIG. 3B is a schematic longitudinal sectional diagram of the stator structure in accordance with a fist preferred embodiment of the invention.

The upper and bottom stator-pole pieces 8a, 8b are each formed with an axis hole on which a protruded tubular piece, respectively labeled with the reference numerals 9a and 9b (in FIG. 2 only the protruded tubular piece 9b on the bottom stator-pole piece 8b is shown, but both are illustrated in FIG. 3B), is formed.

In assembly, the bearing 1 is penetrated through the axis hole of the upper stator-pole piece 8a and the axis hole of the ring coil 3 to be fitted into the protruded tubular piece 9b on the bottom stator-pole piece 8b. This allows the upper and bottom stator-pole pieces 8a, 8b and the ring coil 3 to be coupled axially on the self-lubricating bearing 1. When assembled, the protruded tubular portion 9a of the upper stator-pole piece 8a and the protruded tubular portion 9b of the bottom stator-pole piece 8b are inserted in the axis hole of the ring coil 3 opposite to and come in tight contact with each other, as illustrated in FIG. 3B. This allows the forming of a magnetic flux path through the two protruded tubular pieces 9a, 9b on the upper and bottom stator-pole pieces 8a, 8b.

As shown in FIG. 3B, the axial coupling of the upper and bottom stator-pole pieces 8a, 8b on the self-lubricating bearing 1 has only one interface 11 formed between the protruded tubular portion 9a, 9b. Compared to the prior art of FIG. 1, in which there are two Interfaces 10a, 10b formed in the magnetic flux path, the invention is obviously more advantageous. This allows the brushless motor to be operated with increased efficiency.

Figure 4:
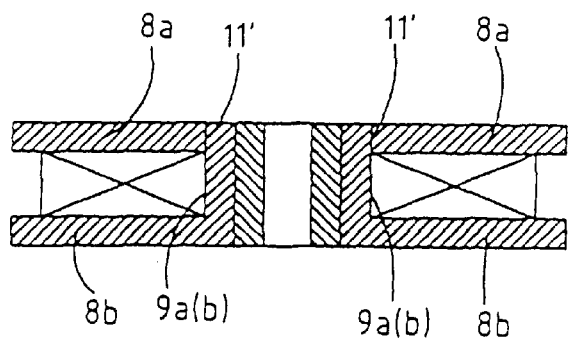
FIG. 4 is a schematic longitudinal sectional diagram of the stator structure in accordance with a second preferred embodiment of the invention.

FIG. 4 is a schematic longitudinal sectional diagram of the stator structure of the brushless motor in accordance with a second preferred embodiment of the invention. This embodiment differs from the previous one in that the upper stator-pole piece 8a is a flat piece not formed with any protruded tubular piece, while the bottom stator-pole piece 8b is formed with an extended protruded tubular piece, here labeled with the reference number 9a(b). The extended protruded tubular portion 9a(b) has a length that allows it to be fit in the axis hole of the upper stator-pole piece 8a. In this embodiment, only one gap, as indicated by the reference numeral 11', is formed between the upper stator-pole piece 8a and the bottom statorpole piece 8b.

Moreover, since in the stator structure of the invention, the flux-guiding sleeve 2 which is an essential component in the prior art of FIG. 1 is here eliminated. The number of components for constituting the stator structure of the invention is thus less than that required for the prior art of FIG. 1. This allows the assembly work to be easier to carry out and also allows for a decreased manufacturing cost of the brushless motor.

In conclusion, the invention can make promising miniature DC brushless motor with less components. This allows for an increased efficiency of the brushless motor compared to the prior art of FIG. 1. Moreover, the number of components required for constructing the stator structure of the invention is also less than that required for the prior art of FIG. 1. The assembly work is thus easier to carry out and the manufacturing cost can be reduced.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. A stator structure for miniaturized DC brushless motor, comprising:

a ring coil having an axially extending hole;

a first stator-pole piece having an axially extending hole on which a first protruded tubular piece is formed, said first stator-pole piece being axially coupled to said coil ring by inserting said first protruded tubular piece into the axially extending hole of said ring coil;

a second stator-pole piece having an axially extending hole on which a second protruded tubular piece is formed, said second stator-pole piece being axially coupled to said ring coil by inserting said second protruded tubular piece into the axially extending hole of said ring coil opposite to said first protruded tubular piece on said stator-pole piece, wherein said first and second protruded tubular pieces have same diameter and come into tight contact to form one interface therebetween; and a bearing penetrating successively through the axially extending hole of said first stator-pole piece and the axially extending hole of said ring coil to be axially coupled to said second protruded tubular piece on said second stator-pole piece.

2. A stator structure for miniaturized DC brushless motor, comprising:

a ring coil having an axially extending hole;

a first stator-pole piece having an axially extending hole on which a first protruded tubular piece is formed, said first stator-pole piece being axially coupled to said coil ring by inserting said first protruded tubular piece into the axially extending hole of said ring coil;

a second stator-pole piece having an axially extending hole, said second stator-pole piece being axially coupled to said ring coil by fitting said protruded tubular piece on said first stator-pole piece through the axially extending hole of said ring coil into the axially extending hole of said second stator-pole piece, wherein said first protruded tubular piece extends through said axially extending hole of said ring coil so as to allow said first protruded tubular piece of said first stator-pole piece to come into tight contact with said second stator-pole piece to form one interface therebetween; and a bearing penetrating successively through the axially extending hole of said first stator-pole piece and the axially extending hole of said ring coil to be axially coupled to said second protruded tubular piece on said second stator-pole piece.

* * * * *